United States Patent [19]

Ushijima et al.

[11] Patent Number: 4,630,808
[45] Date of Patent: Dec. 23, 1986

[54] VIBRATION ISOLATING DEVICES

[75] Inventors: Takao Ushijima, Chigasaki; Harumichi Yamazaki, Tokyo, both of Japan

[73] Assignee: Bridgestone Corporation, Tokyo, Japan

[21] Appl. No.: 687,337

[22] Filed: Dec. 28, 1984

[30] Foreign Application Priority Data

Dec. 28, 1983 [JP] Japan .................................. 58-248908
Jun. 13, 1984 [JP] Japan .................................. 59-121530

[51] Int. Cl.⁴ .............................................. F16F 9/10
[52] U.S. Cl. .................................. 267/140.1; 267/8 R
[58] Field of Search ....................... 188/320; 248/562; 267/8 R, 63 R, 121, 122, 140.1

[56] References Cited

U.S. PATENT DOCUMENTS 4,262,886  4/1981  Le Salver et al. ............ 267/140.1 X
4,483,521  11/1984  Kakimoto ..................... 267/140.1 X
4,588,173  5/1986  Gold et al. ....................... 267/140.1

FOREIGN PATENT DOCUMENTS 0098331  1/1984  European Pat. Off. ......... 267/140.1
G8119912  8/1982  Fed. Rep. of Germany .
3142673  5/1983  Fed. Rep. of Germany .
3207889  9/1983  Fed. Rep. of Germany .
2415241  8/1979  France .
2472116  6/1981  France .
94043  7/1981  Japan .
76340  5/1982  Japan .
190531  10/1984  Japan .
2041485  9/1980  United Kingdom ............. 267/140.1
2087511  5/1982  United Kingdom .

Primary Examiner—Duane A. Reger
Attorney, Agent, or Firm—Sughrue, Mion, Zinn, Macpeak & Seas

[57] ABSTRACT

A vibration isolating device is disclosed, which comprises a main vibration-absorbing body provided with a hollow chamber containing a vibration-damping liquid, and plural partition members each provided with a restricted passage to divide the hollow chamber into at least three small liquid chambers. In this device, one of the partition members is provided with a restricted passage having a sectional area larger than that of the restricted passage formed in the other remaining partition members.

5 Claims, 20 Drawing Figures

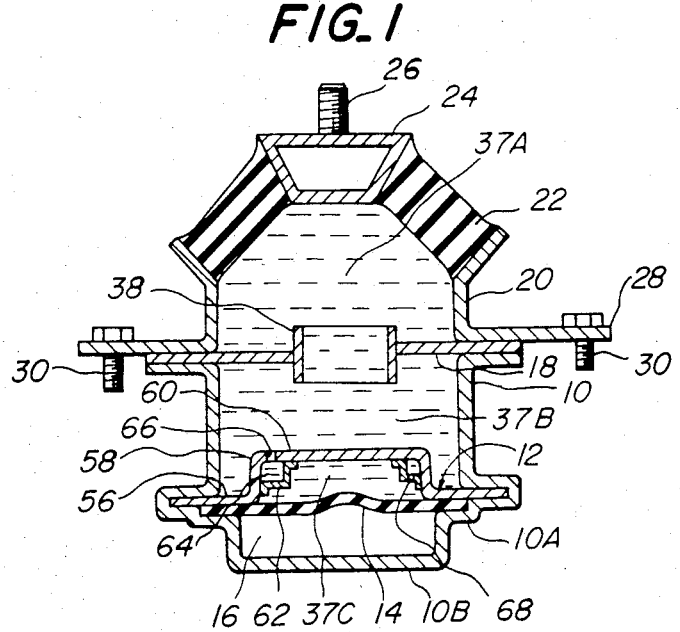
FIG_1
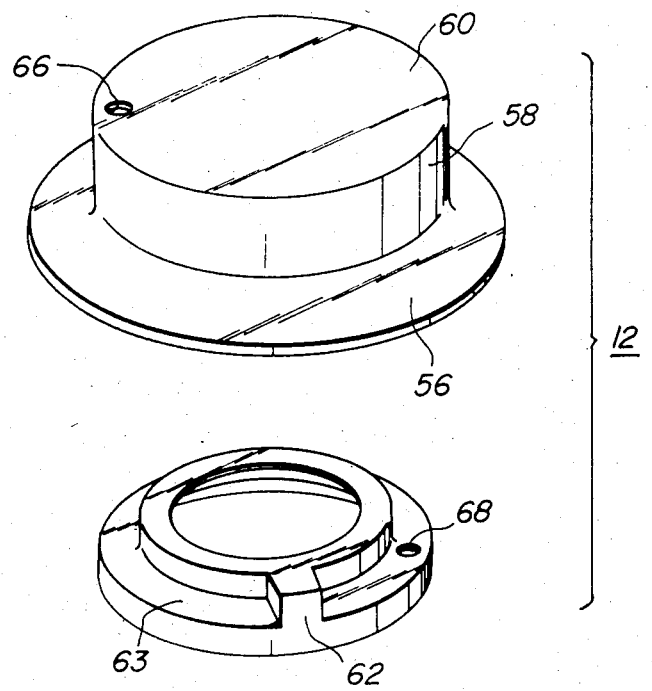
FIG_2

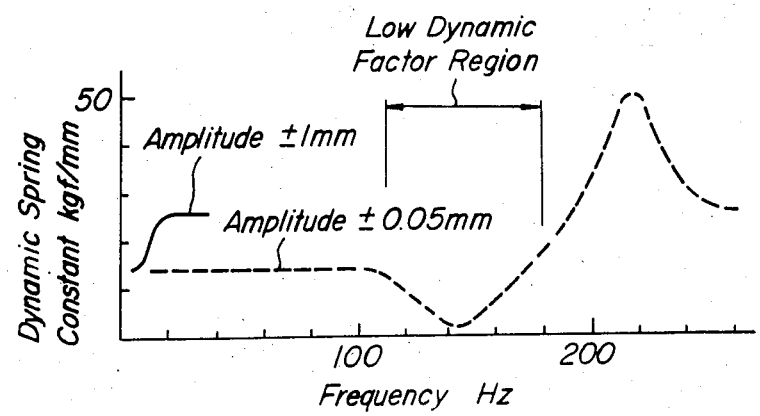
FIG_10a
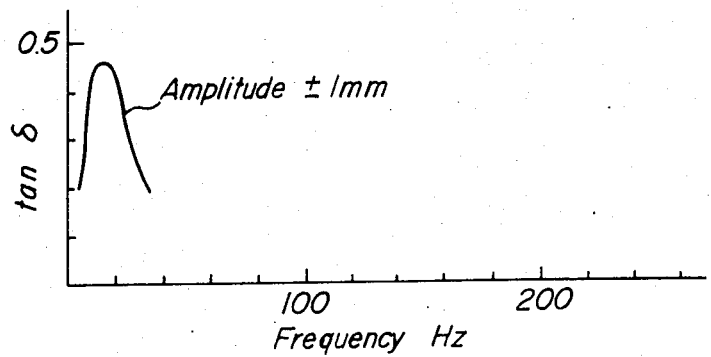
FIG_10b

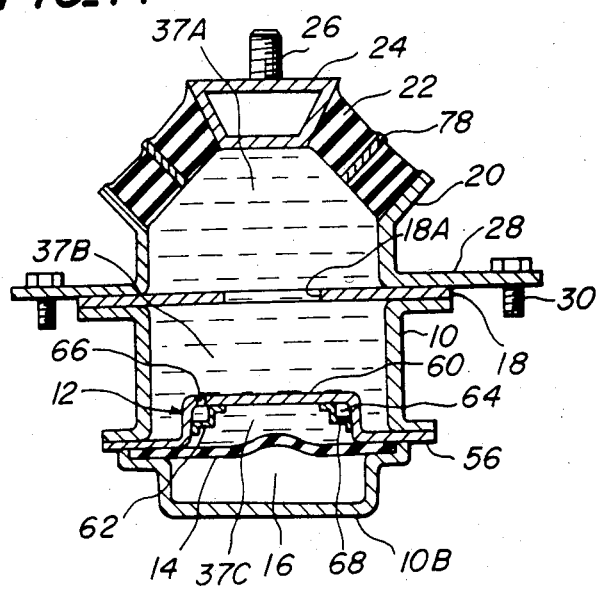
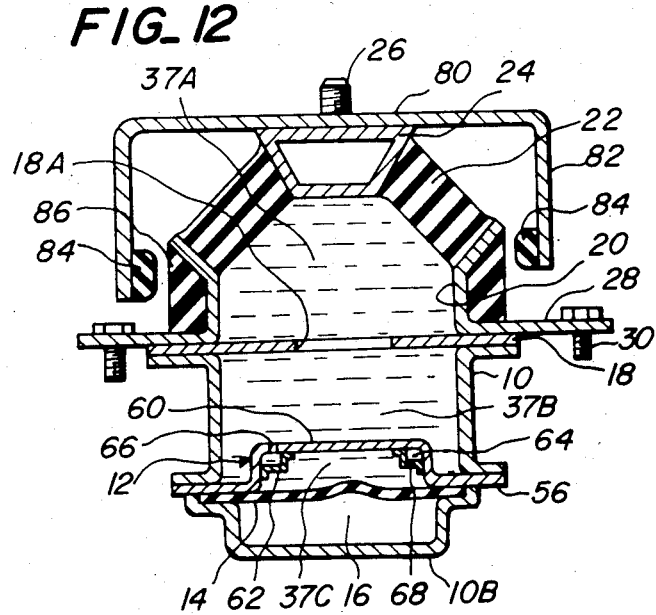

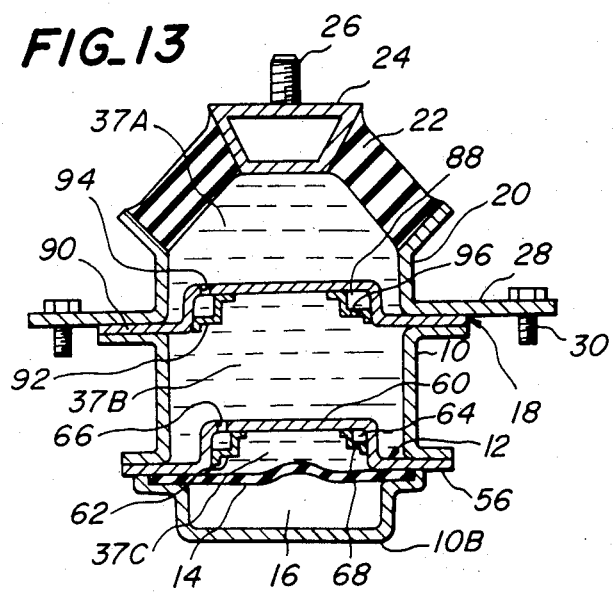

FIG_17
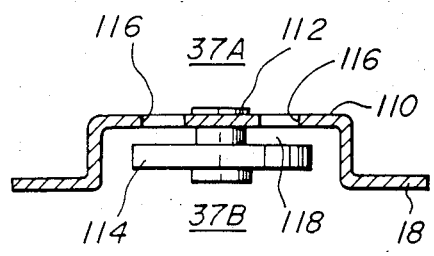
FIG_18
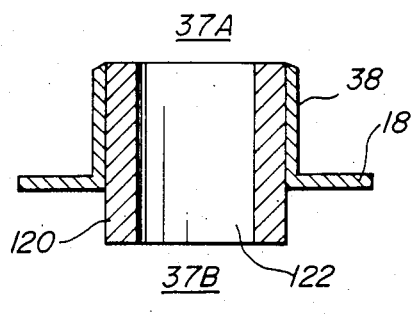

VIBRATION ISOLATING DEVICES

BACKGROUND OF THE INVENTION

1. Field of the Invention

This invention relates to a vibration isolating device for damping vibrations from vibration source.

2. Description of the Prior Art

The vibration isolating device generally called as a rubber vibration isolator and is used, for example, as an engine mount for automobile vehicles, whereby vibrations from an internal-combustion engine are absorbed so as not to be transmitted to a vehicle chassis.

As the vibration isolating device of this type, there has been proposed a vibration isolating device comprising two vibration-damping liquid chambers separated by a partition member provided with a restricted passage, in which vibrations from vibration source are absorbed by a flow resistance subjected to the liquid when the vibration is transmitted to the one chamber to thereby flow the liquid from the one chamber to the other through the restricted passage. In this device, not only is the vibration transmitting force lowered as far as possible at various vibration frequencies, but also the damping force is developed at a frequency range of 10-20 Hz corresponding to the vibration from the engine.

In the conventional engine mount, however, it is very difficult to absorb vibrations of a particular frequency other than the engine vibration. That is, when the vibration input to the engine mount is a high frequency, the amplitude is small to clog the restricted passage, so that the pressure inside the liquid chamber rises to increase the dynamic spring constant. As a result, the vibration transmitting rate is undesirably raised to deteriorate the ride comfort on the vehicle.

As a countermeasure for solving the latter problem, there has also been proposed a vibration isolating device capable of absorbing high-frequency vibrations, but it is not yet sufficient to damp those high-frequency vibrations. Therefore, it is strongly demanded to develop a vibration isolating device capable of damping vibrations at a wider frequency range.

SUMMARY OF THE INVENTION

With the foregoing in mind, it is an object of the invention to provide a vibration isolating device which can effectively prevent the transmission of vibrations to a vehicle chassis by not only generating a damping force against low frequency vibration but also suppressing a dynamic factor to not more than 1.5 times the resonance of the damping liquid against vibrations of a higher frequency range.

According to the invention, there is the provision of a vibration isolating device comprising a main vibration-absorbing body composed mainly of an elastomeric material and provided at its inside with a hollow chamber containing a vibration-damping liquid therein, and plural partition members each provided with a restricted passage therein to divide said hollow chamber into at least three small liquid chambers, one of said restricted passages having a sectional area larger than that of the other remaining restricted passages.

BRIEF DESCRIPTION OF THE DRAWINGS

The invention will be described with reference to the accompanying drawings, wherein:

FIG. 1 is a sectional view of a first embodiment of the vibration isolating device according to the invention;

FIG. 2 is an exploded perspective view of a lower partition member used in the vibration isolating device of FIG. 1;

FIGS. 10a and 10b are graphs showing dynamic factor and tan $\delta$ with respect to frequency in the device of FIG. 8, respectively;

FIGS. 11 to 14 are sectional views of sixth to ninth embodiments of the vibration isolating device according to the invention, respectively;

FIGS. 17 and 18 are sectional views of the other embodiments of the partition member used in the invention, respectively.

Like parts are designated by like numerals throughout the different figures of the drawings.

DESCRIPTION OF THE PREFERRED EMBODIMENTS

Figure 3A:
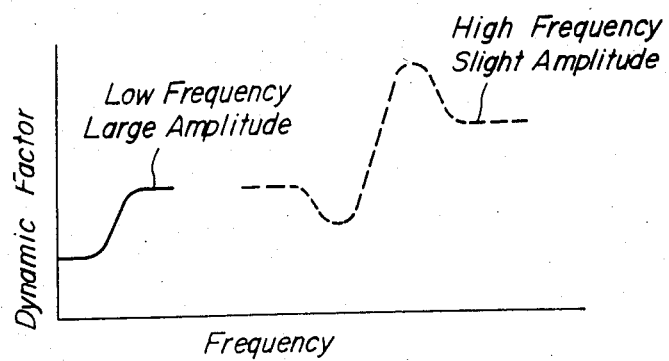
FIGS. 3a and 3b are graphs showing dynamic factor and tan $\delta$ with respect to frequency in the device of FIG. 1, respectively.

In FIG. 1 is sectionally shown a first embodiment of the vibration isolating device according to the invention. This vibration isolating device is used as an engine mount for automobile vehicle.

The vibration isolating device comprises a hollow bottom cylinder 10, to the inside of which at its axially middle position is clamped an outer peripheral portion of a ring plate 12. Further, a lower diaphragm 14 is clamped at its outer peripheral portion between the ring plate 12 and a step portion 10A of the cylinder 10 formed just beneath the ring plate 12 and forms an air chamber 16 together with a bottom plate 10B of the cylinder 10. This air chamber 16 may be communicated with an exterior through a hole formed in the bottom plate 10B.

The upper end portion of the bottom cylinder 10 is fixed to a lower end portion of a joint cylinder 20 through an upper partition member 18.

The upper end portion of the joint cylinder 20 is enlarged upward to which is bonded a rubber member 22 as a vibration-absorbing main body by vulcanization. In this case, other elastomeric materials may be used instead of the rubber member 22. The upper end portion of the rubber member 22 is bonded by vulcanization to a base plate 24 provided with a fitting bolt 26. The base plate 24 is used for carrying an engine (not shown), wherein the engine is fixed to the base plate 24 through the fitting bolt 26.

A flange 28 protrudes outward from the lower end portion of the joint cylinder 20 and is provided with plural fitting bolts 30 for fixing a vehicle chassis (not shown).

A closed space is defined as a liquid chamber by the bottom cylinder 10, lower diaphragm 14, joint cylinder 20, rubber member 22 and base plate 24 and filled with a vibration-damping liquid such as water or the like.

The upper partition member 18 divides the closed space into an upper liquid chamber 37A and a middle liquid chamber 37B. Both the liquid chambers communicate with each other through cylindrical hole 38 formed in the center of the partition member 18 as a restricted passage.

The ring plate 12 clamped together with the lower diaphragm 14 to the bottom cylinder 10 serves as a lower partition member and comprises a central upheaved portion composed of a cylindrical part 58 and a ceiling part 60, which divides the closed space into the middle liquid chamber 37B and a lower liquid chamber 37C. Thus, the closed space is divided into the upper liquid chamber 37A, middle liquid chamber 37B and lower liquid chamber 37C by the upper partition member 18 and the lower partition member 12.

As shown in FIG. 2, the ring plate 12 is formed by lapping and fixing two plate materials 56 and 62. The plate material 56 is a hat-shaped body provided with the cylindrical part 58 and the ceiling part 60 and made, for example, by deep drawing of a disc metal sheet. To a recessed bottom of the plate material 56 is fixed the plate material 62 of an annular metal sheet provided at its outer peripheral portion with a ring-like depression 63. In this way, a restricted passge or an orifice 64 is formed between the plate material 56 and the plate material 62, and communicates with the middle liquid chamber 37B through an opening 66 formed in the ceiling part 60 of the plate material 56 on the one hand and with the lower liquid chamber 37C through an opening 68 formed in the plate material 62 on the other hand.

In this illustrated embodiment, the partition member 18 provided with the cylindrical hole 38 is disposed at a side of vibration source or near the base plate 24. Further, the orifice 64 is small in the diameter and long in its axial length as compared with the cylindrical hole 38. (The axial length of the orifice 64 is more than 5 times the sectional area thereof.)

The operation of the vibration isolating device of FIG. 1 will be described below.

The flange 28 is mounted on the vehicle chassis and fixed thereto through the fitting bolts 30, while the engine for automobile vehicle is fixed to the base plate 24 through the fitting bolt 26.

In the mounting of the engine, the dead weight of the engine is applied to the base plate 24 to increase the pressure inside the upper liquid chamber 37A. Such an increase of the pressure is transmitted to the middle liquid chamber 37B through the cylindrical hole 38 and further to the lower liquid chamber 37C through the orifice 64, whereby the lower diaphragm 14 is displaced toward a direction of contracting the air chamber 16.

In operation of the engine, vibrations generated from the engine are transmitted to the device through the base plate 24. Of course, the rubber member 22 can absorb the vibration owing to its damping function based on internal friction.

In case of a low vibration frequency, for example, when vibrations have a frequency range of 5–20 Hz and an amplitude of ±0.5–1.0 mm, the vibration-damping effect is further enhanced by the viscosity resistance caused in the flowing of the liquid through the restricted passage having a long axial length and a small sectional area or the orifice 64. In this case, the cylindrical hole 38 hardly develops the vibration-damping action because it has a large sectional area.

Particularly, the vibration-damping effect against vibrations of low frequency and large amplitude is large because the orifice 64 is a C-shaped, and the long restricted passage defined between the plate material 56 and the plate material 62. Moreover, the axial length of the orifice 64 may optionally be adjusted by changing a relative angle between the openings 66 and 68 when fixing the plate material 62 to the plate material 56 by welding or the like.

In case of a high vibration frequency, for example, when vibrations have a frequency range of more than 20 Hz and a slight amplitude, there is a possibility that the orifice 64 reaches a choking state. In this case, the cylindrical hole 38 does not produce such choking owing to its large sectional area, so that the liquid inside the device produces a liquid column resonance, whereby specified high frequency vibrations are appropriately absorbed in accordance with the shape and size of the cylindrical hole 38.

In the illustrated embodiment, the bottom cylinder 10 may be made from a metal or a flexible elastomer. As the bottom cylinder is rendered flexible, the resonance frequency produced in the cylindrical hole 38 and the orifice 64 becomes lower, from which a proper resonance frequency can be selected.

The size of the cylindrical hole 38 in FIG. 1 will be described below.

Assuming that the volume of the upper liquid chamber 37A is changed by A $cm^3$ when the rubber member 22 is bent by 1 cm under the application of the engine dead weight, if the upper liquid chamber 37A has an effective diameter of $D_0$ cm and an effective sectional area of $\pi (D_0/2)^2$ and the cylindrical hole 38 has a length of L cm and a diameter of D cm, it is required to satisfy $D/D_0$ of not less than $\frac{1}{3}$ and $L/D^2$ of not more than $\frac{1}{3}$.

When $D/D_0$ is less than $\frac{1}{3}$, the cylindrical hole 38 is apt to produce the clogging at the high vibration frequency. Further, when $L/D^2$ is more than $\frac{1}{3}$, the reduction of dynamic factor occurs at a low vibration frequency. The term "dynamic factor" used herein means a ratio of dynamic spring constant to static spring constant.

When the size of the cylindrical hole 38 satisfies the above requirements, a low dynamic factor can be obtained at a high frequency range of 100–200 Hz.

Figure 3B:
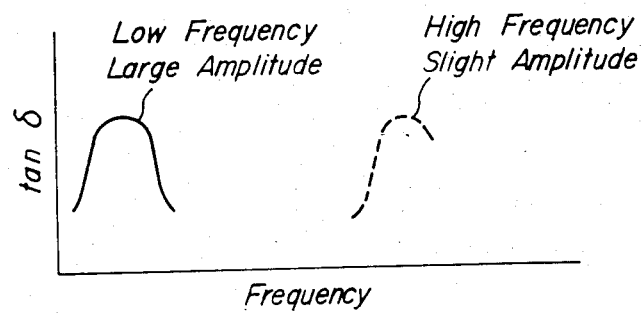

FIG. 3a shows a relation between the frequency and the dynamic factor in the device of FIG. 1, and FIG. 3b shows a relation between the frequency and the loss factor (tan δ) in the same device, from which it is understood that a large vibration-damping force can be obtained at an arbitrary frequency.

Figure 4:
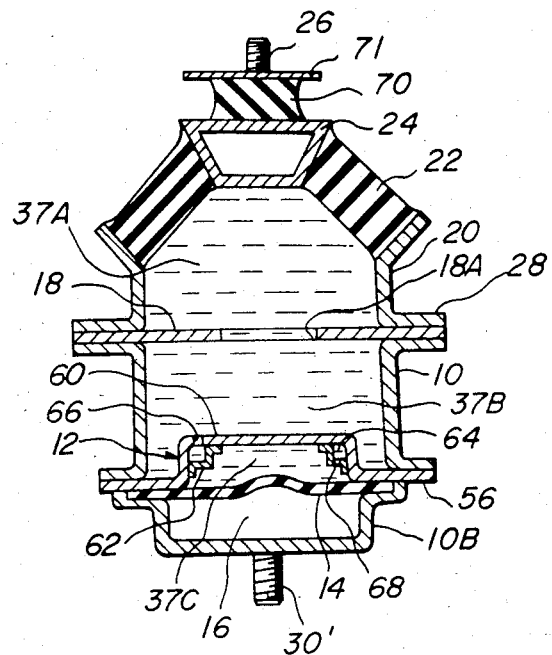
FIG. 4 is a sectional view of a second embodiment of the vibration isolating device according to the invention.

In FIG. 4 is shown a second embodiment of the vibration isolating device according to the invention, which is a modification of the device shown in FIG. 1. That is, the ring plate or partition member 18 is provided with an opening 18A instead of the cylindrical hole 38. Further, a rubber member 70 having a hardness larger than that of the rubber member 22 is secured at its one end to an upper surface of the base blate 24 and at the other end to a fitting plate 71 for an engine provided with the fitting bolt 26. Moreover, the bottom plate 10B is provided at its outer bottom surface with a fitting bolt 30'.

Figure 5:
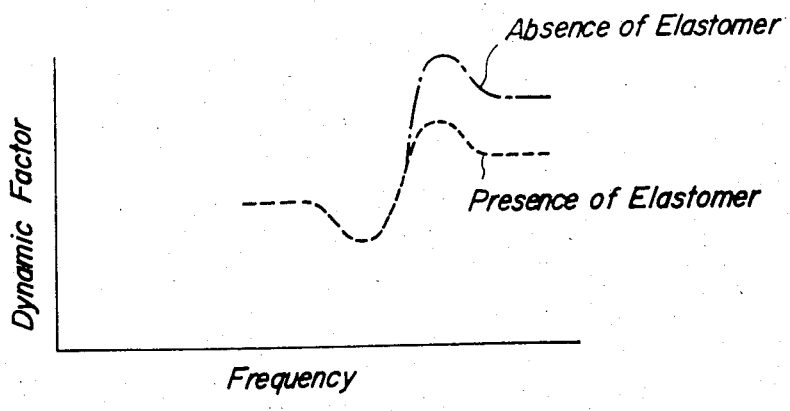
FIG. 5 is a graph showing a relation between frequency and dynamic factor in the device of FIG. 4.

In the embodiment of FIG. 4, the build-up of the dynamic factor in the liquid column resonance can be made low as shown in FIG. 5. Moreover, the rubber member 70 may also be disposed at the side of the bottom cylinder 10.

Figure 6:
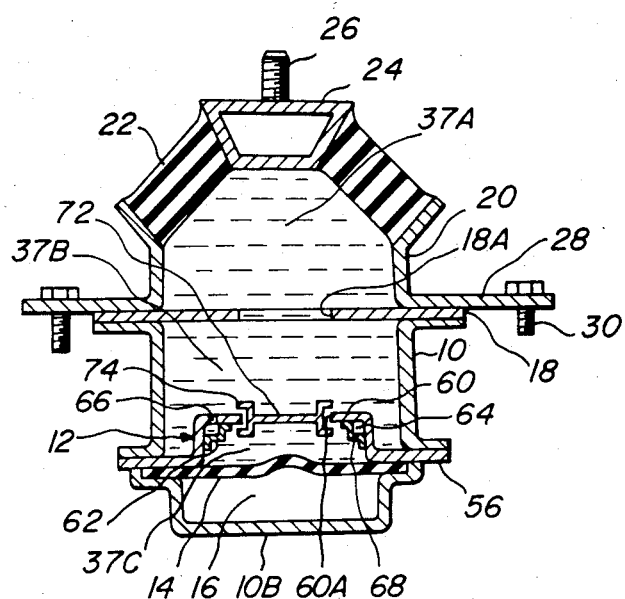
FIGS. 6 to 8 are sectional views of third to fifth embodiments of the vibration isolating device according to the invention, respectively.

In FIG. 6 is shown a third embodiment of the vibration isolating device according to the invention, which is also a modification of the device shown in FIG. 1. That is, the partition member 18 is provided with an opening 18A instead of the cylindrical hole 38. Further, the plate material 56 constituting a part of the partition member 12 is provided at the center of the ceiling portion 60 with a circular hole 60A for receiving a movable disc body 70. This movable disc body 79 is provided at its outer peripheral edge with a flange 74 of channel-shape in section and is possible to move in up and down direction by a slight amount (about 0.1–0.05 mm) with respect to the peripheral edge of the circular hole 60A. Thus the pressure increase can be suppressed under high frequency vibrations. The fitting position of the movable disc body 72 is not restricted as far as it is existent between the middle liquid chamber 37B and the lower liquid chamber 37C.

Figure 7:
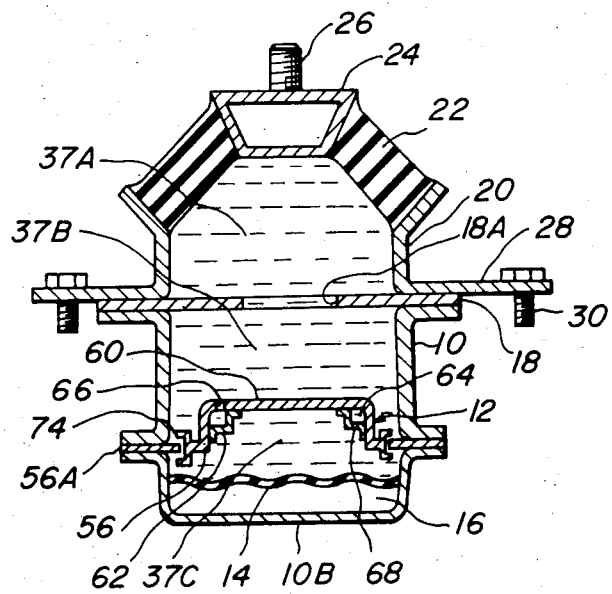

In FIG. 7 is shown a fourth embodiment of the vibration isolating device according to the invention, which is a further modification of the device shown in FIG. 4. In this case, the partition member 12 is formed by clamping an annular plate 56A between the bottom cylinder 10 and the bottom plate 10B thereof and inserting the plate material 56 provided at its outer peripheral edge with a flange 74 of channel-shape in section into a hole of the annular plate 56A. Thus, it is possible to slightly move the plate material 56 in an up and down direction with respect to the annular plate 56A and hence the bottom cylinder 10 so that there can be obtained the same effect as in the device of FIG. 6.

Figure 8:
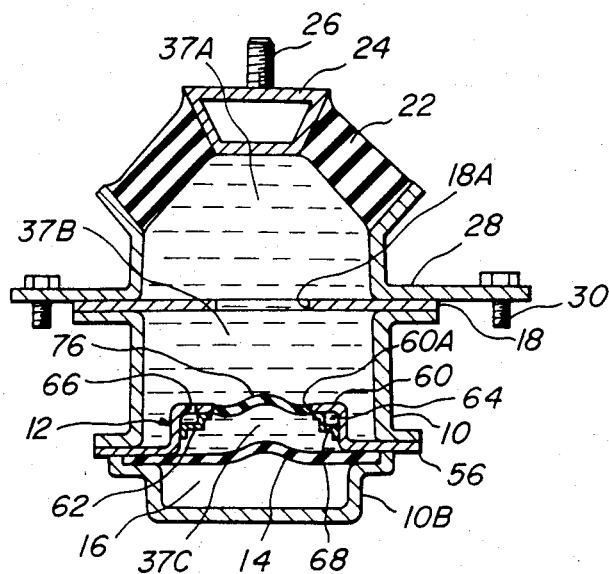

In FIG. 8 is shown a fifth embodiment of the vibration isolating device according to the invention, which is a modification of the device shown in FIG. 6. That is, a rubber membrane 76 is fixed to a peripheral edge of the circular hole 60A formed in the central portion of the ceiling portion 60 instead of the movable disc body 72. In this case, wire cords or the like are embedded in the rubber membrane 76 to restrict the moving quantity of the membrane 76. Thus, the rubber membrane 76 plays the same role as the movable disc body 72.

Figure 9:
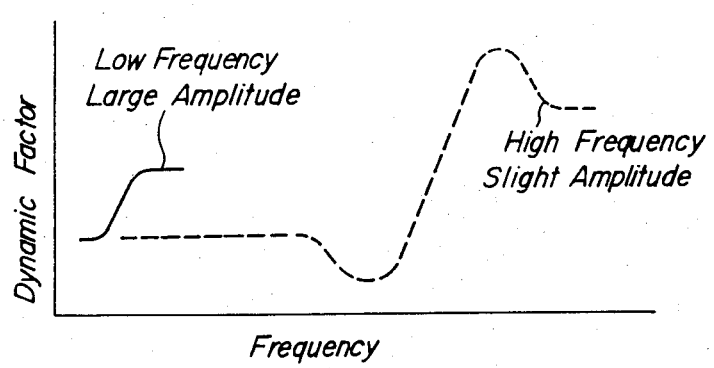
FIG. 9 is graph showing a relation between frequency and dynamic factor in the devices of FIGS. 6, 7 and 8.

FIG. 9 shows the relation between the frequency and the dynamic factor in the devices of FIGS. 6, 7 and 8.

FIGS. 10a and 10b show experimental results in the device of FIG. 8. In this experiment, the upper liquid chamber 37A is filled with 70 cc of an anti-freezing liquid, each of the middle and lower liquid chambers 37B, 37C is filled with 30 cc of an anti-freezing liquid. The air chamber 16 is filled with 70 cc of air, the rubber member has a dynamic spring constant of 120 kgf/cm and tan δ (loss factor) of 0.1. The bottom cylinder 10 is an elastomer having the same volume elasticity as that of the rubber member and a dynamic spring constant of 220 kgf/cm. Further, the opening 18A has a diameter of 4 cm and a length of 0.5 cm and the orifice 64 has a diameter of 0.8 cm and a length of 5.0 cm. In the device having the above dimensions, tan δ can be made large against vibrations having a frequency of 10–15 Hz and an amplitude of ±1 mm as shown in FIGS. 10a and 10b. Furhter, since the device has the rubber membrane 76 as a movable member, there is no building-up of the dynamic spring constant against vibrations having a frequency fo about 10 Hz and a small amplitude of about ±0.05 mm and tan δ is not produced at a frequency of about 10 Hz. And also, the dynamic spring constant can considerably be reduced at a frequency of 100–180 Hz due to the presence of the opening 18A.

In FIG. 11 is shown a sixth embodiment of the vibration isolating device according to the invention, which is also a modification of FIG. 4. In this case, a ring member 78 is embedded in the rubber member 22 to adjust the elastic force of the rubber member 22.

In FIG. 12 is shown a seventh embodiment of the vibration isolating device according to the invention, wherein a regulating plate 80 is integrally fixed to the top surface of the base plate 24 and extends outward therefrom. The outer peripheral portion of the regulating plate 80 is bent downward at a right angle to form a regulation part 82. An annular rubber stopper 84 is secured to the inner surface of the regulation part 82 and is opposite to a rubber member 86 fixed to the outer peripheral surface of the joint cylinder 20. In this embodiment, therefore, the movment of the base plate 24 in the lateral direction can be restricted.

In FIG. 13 is shown an eighth embodiment of the vibration isolating device according to the invention, wherein the partition member 18 is formed by lapping and fixing two plate materials 90 and 92 in the same shape as in the ring plate 12 to form an orifice 88. In this case, the orifice 88 is large in the sectional area and short in the axial length as compared with the orifice 64 of the ring plate 12.

In FIG. 14 is shown a ninth embodiment of the vibration isolating device according to the invention, wherein the ring plate 12 composed of the two plate material 56 and 62 as shown in FIG. 2 is clamped at its outer periphery between a ring plate member 12A and the lower diaphragm 14 in the middle portion of the bottom cylinder 10. Also the partition member 18, composed of two plate materials 90 and 92, is clamped at its outer periphery between a ring plate member 18A and the joint cylinder 20. Further, a cylindrical diaphragm 32 is bonded by vulcanization at its upper and lower end portions to the ring plate members 18A and 12A. Thus an air chamber 34 is formed between the cylindrical diaphragm 32 and the bottom cylinder 10. In this case the air chamber 34 may communicate with an exterior through a hole formed in the bottom cylinder 10.

Figure 15:
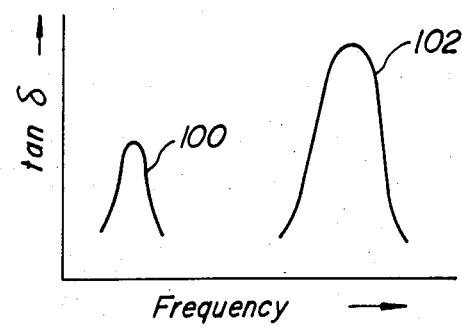
FIGS. 15 and 16 are graphs showing tan $\delta$ and dynamic factor with respect to frequency in the device of FIG. 14, respectively.

FIG. 15 shows the relation between the freqeuncy and the loss factor (tan δ) of the device shown in FIG. 14, wherein a characteristic curve 100 is the case against vibrations having a low frequency and a large amplitude and a characteristic curve 102 is the case against vibrations having a high frequency and a small amplitude. Furthermore, FIG. 16 shows the relation between the frequency and the dynamic factor of the device shown in FIG. 14, wherein a characteristic curve 104 is the case against vibrations having a low frequency and a large amplitude and a characteristic curve 106 is the case against vibrations having a high frequency and a small amplitude.

Figure 16:
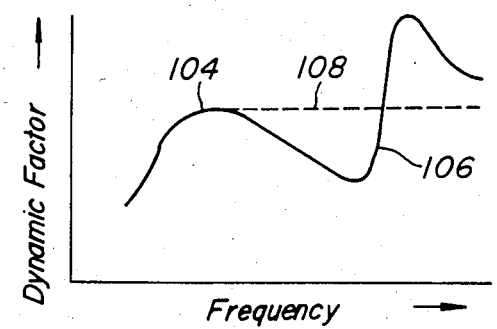

In FIGS. 15 and 16, the characteristics 100 and 104 are achieved by the orifice 64, while the characteristics 102 and 106 are achieved by the orifice 88. A characteristic 108 shown by dotted lines in FIG. 16 shows the relation between the frequency and the dynamic factor when only the orifice 64 is provided in the device of FIG. 14.

In FIG. 17 is shown a modification of the partition member 18 as shown in FIG. 1, wherein the partition member 18 is a hat-shaped body of a plate material 110 and a flat plate 114 is disposed in a recess portion of the plate material 110 through a pin 112 fixed to the center of the ceiling part of the plate material 110. Further, a plurality of small circular holes 116 are formed in the ceiling part around the pin 112 in correspondence with the flat plate 114. Thus, the upper liquid chamber 37A is communicated with the middle liquid chamber 37B through a restricted passage 118 defined between the ceiling part of the plate material 110 having holes 116 and the flat plate 114.

In FIG. 18 is shown another modification of the partition member 18 shown in FIG. 1, wherein a hollow cylindrical body 120 is fixed to the inner peripheral surface of that portion of the partition member 18 which forms the cylindrical hole 38. Therefore, the inside of the cylindrical body 120 defines a restricted passage 90.

In the embodiments of FIGS. 17 and 18, vibrations having a high frequency and a small amplitude can be absorbed by the liquid column resonance through the restricted passage 118 or 122. Moreover, the vibration frequency to be absorbed can be adjusted by optionally changing the size of such a restricted passage.

Although all of the above illustrated embodiments have been described with respect to the small three liquid chambers divided by two partition members, the invention is applicable to the vibration isolating devices having four or more small liquid chambers. In the latter case, a restricted passage having a largest sectional area among restricted passages communicating the liquid chambers with each other is disposed near the side of vibration source.

As mentioned above, according to the invention, the hollow chamber in the main vibration-absorbing body composed mainly of the elastomeric material is filled with a vibration-damping liquid and divided into a least three liquid chambers by plural restricted passages, and a first restricted passage among these restricted passages has a diameter larger than that of the remaining restricted passages, so that vibrations over a wide frequency range can be damped effectively. Further, the size of the restricted passage can be adequately changed in accordance with the vibration frequency to be absorbed.

What is claimed is:

1. A vibration isolating device comprising; two frame bodies for joining to a vibration source side on one hand and a vibrating side on the other hand, a vibration-absorbing body interposed between said two frame bodies and composed of an elastomeric material, a hollow chamber mainly defined by an inner wall face of said vibration-absorbing body and containing a vibration-damping liquid therein, and first and second partition members dividing said hollow chamber into first, second and third liquid chambers; said first liquid chamber being defined by wall faces including at least vibration-absorbing body and first partition member; said second liquid chamber being defined by all faces including at least first and second partition members; each of said two partition members being provided with a restricted passage establishing communication between the adjacent liquid chambers; said restricted passage in said first partition member having a sectional area larger than that in said second partition member; and said second liquid chamber being provided with a pressure-reducing means.

2. The vibration isolating device according to claim 1, wherein one of the partition members being and provided with a first restricted passage having a sufficiently large diameter to prevent a choked condition, and the other partition member being provided with a second restricted passage having a small diameter and a long axial length as compared with said first restricted passage.

3. The vibration isolating device according to claim 1, wherein said first restricted passage satisfies the following relationships:

$$D/D_0 \geq \tfrac{1}{3}, \text{ and}$$

$$L/D^2 \leq \tfrac{1}{3},$$

in which D is a diameter of said first restricted passage, L is a length of said first restricted passage and $D_0$ is an effective diameter of a liquid chamber located above said first restricted passage.

4. The vibration isolating device according to claim 1, wherein said pressure-reducing means comprises a movable second partition member.

5. The vibration isolating device according to claim 1, wherein said pressure-reducing means comprises, a portion of said wall face comprising an elastomeric material.

* * * * *